(12) United States Patent
Corfitsen

(10) Patent No.: US 11,077,764 B2
(45) Date of Patent: Aug. 3, 2021

(54) DEVICE AND METHOD FOR AUTOMATICALLY CONNECTING A CABLE TO A PARKED VEHICLE

(71) Applicant: GREEN ISLAND CAPITAL AB, Stockholm (SE)

(72) Inventor: Sten Corfitsen, Stockholm (SE)

(73) Assignee: GREEN ISLAND CAPITAL AB

( * ) Notice: Subject to any disclaimer, the term of this patent is extended or adjusted under 35 U.S.C. 154(b) by 158 days.

(21) Appl. No.: 16/486,566

(22) PCT Filed: Feb. 16, 2018

(86) PCT No.: PCT/SE2018/050153
§ 371 (c)(1),
(2) Date: Aug. 16, 2019

(87) PCT Pub. No.: WO2018/151662
PCT Pub. Date: Aug. 23, 2018

(65) Prior Publication Data
US 2020/0001734 A1    Jan. 2, 2020

(30) Foreign Application Priority Data
Feb. 16, 2017    (SE) .................................. 1750153-7

(51) Int. Cl.
*B60L 53/18*    (2019.01)
*B60L 53/35*    (2019.01)
(Continued)

(52) U.S. Cl.
CPC ............... *B60L 53/18* (2019.02); *B60L 50/60* (2019.02); *B60L 53/14* (2019.02); *B60L 53/16* (2019.02); *B60L 53/35* (2019.02)

(58) Field of Classification Search
CPC .......... B60L 53/18; B60L 53/35; B60L 53/16
See application file for complete search history.

(56) References Cited

U.S. PATENT DOCUMENTS

| 7,999,506 B1 | 8/2011 | Hollar |
| 9,056,555 B1 | 6/2015 | Zhou |

(Continued)

FOREIGN PATENT DOCUMENTS

| FR | 1074805 A | 10/1954 |
| WO | 2016102099 A1 | 6/2016 |

OTHER PUBLICATIONS

International Search Report from corresponding International Patent Application No. PCT/SE2018/050153, dated Jun. 27, 2018, 4 pages.

*Primary Examiner* — David V Henze-Gongola
(74) *Attorney, Agent, or Firm* — Tucker Ellis LLP

(57) ABSTRACT

The invention is characterised in that the device comprises a first (120), a second (130) and a third (110) elongated element; a first moving unit (140), pivotally connected to a first end of the first elongated element; a second moving unit (150), pivotally connected to a first end of the second elongated element; a cable connecting unit (160), pivotally connected to a second end of the first elongated element and to a second end of the second elongated element; and a control unit (170), in that the third elongated element is arranged to be fixedly mounted at a parking space, in that both moving units are arranged to be controlled by the control unit to be displaced in either direction along the third elongated element, in that such displacement causes the cable connecting unit to be displaced in relation to the third elongated element, and in that the cable connecting unit is arranged to connect the cable to the vehicle by pressing a connecting means (162) against a corresponding connector of the vehicle.

10 Claims, 4 Drawing Sheets

(51) Int. Cl.
 *B60L 53/16* (2019.01)
 *B60L 50/60* (2019.01)
 *B60L 53/14* (2019.01)

(56) References Cited

U.S. PATENT DOCUMENTS

2013/0076902 A1* 3/2013 Gao .................. B60L 53/35
 348/148
2017/0008411 A1* 1/2017 Wu .................. B60L 53/35

* cited by examiner

DEVICE AND METHOD FOR AUTOMATICALLY CONNECTING A CABLE TO A PARKED VEHICLE

The present invention relates to a device for connecting a cable to a parked vehicle, in particular for charging of a battery in said vehicle.

Increasingly, cars and other vehicles become electrified, either by being completely propelled by an internal battery, or by using a battery collaborating with an explosion motor in various ways. The present application is useful for vehicles with such a battery, where the vehicle comprises an electric cable connection for charging the battery using an external power source. This pertains to cars, motorcycles, trucks, buses and speciality utility vehicles, that are all covered by the present invention.

When parking such a vehicle, such as in a garage, the user must normally manually connect a cable to the vehicle, in order for the battery to being charged. This handling is often perceived as inconvenient by the driver, in particular since the handling of cables in parking lots may be dirty. Also, there is a risk that the charging does not work as intended, for instance if the cable is not properly inserted into the charging connector.

The present invention solves the above described problems.

Hence, the invention relates to a device for automatically connecting a cable to a parked vehicle, which device is characterised in that the device comprises a first, a second and a third elongated element; a first moving unit, pivotally connected to a first end of the first elongated element; a second moving unit, pivotally connected to a first end of the second elongated element; a cable connecting unit, pivotally connected to a second end of the first elongated element and to a second end of the second elongated element; and a control unit, in that the third elongated element is arranged to be fixedly mounted at a parking space, in that both moving units are arranged to be controlled by the control unit to be displaced in either direction along the third elongated element, in that such displacement causes the cable connecting unit to be displaced in relation to the third elongated element, and in that the cable connecting unit is arranged to connect the cable to the vehicle by pressing a connecting means against a corresponding connector of the vehicle.

Moreover, the invention also relates to a method for automatically connecting a cable to a parked vehicle, which method is characterised in that the method comprises the steps of a) providing, at a parking space, a cable connecting device, comprising a first, a second and a third elongated element; a first moving unit, pivotally connected to a first end of the first elongated element; a second moving unit, pivotally connected to a first end of the second elongated element; a cable connecting unit, pivotally connected to a second end of the first elongated element and to a second end of the second elongated element; and a control unit, the third elongated element being fixedly mounted at a parking space, both moving units being arranged to be controlled by the control unit to be displaced in either direction along the third elongated element, so that such displacement causes the cable connecting unit to be displaced in relation to the third elongated element; b) causing the control unit to control the movements of the first and second moving units along the third elongated member so that the cable connector unit moves towards a connector of the vehicle; and c) causing the control unit to control the movements of the first and second moving units along the third elongated member so that a connecting means of the cable connecting unit is pressed against a corresponding connector of the vehicle, thereby establishing an electric connection between the cable and the vehicle.

In the following, the invention will be described in detail, with reference to exemplifying embodiments of the invention and to the enclosed drawings, wherein.

In all the Figures, the same reference numerals are used for the same parts.

Figure 1:
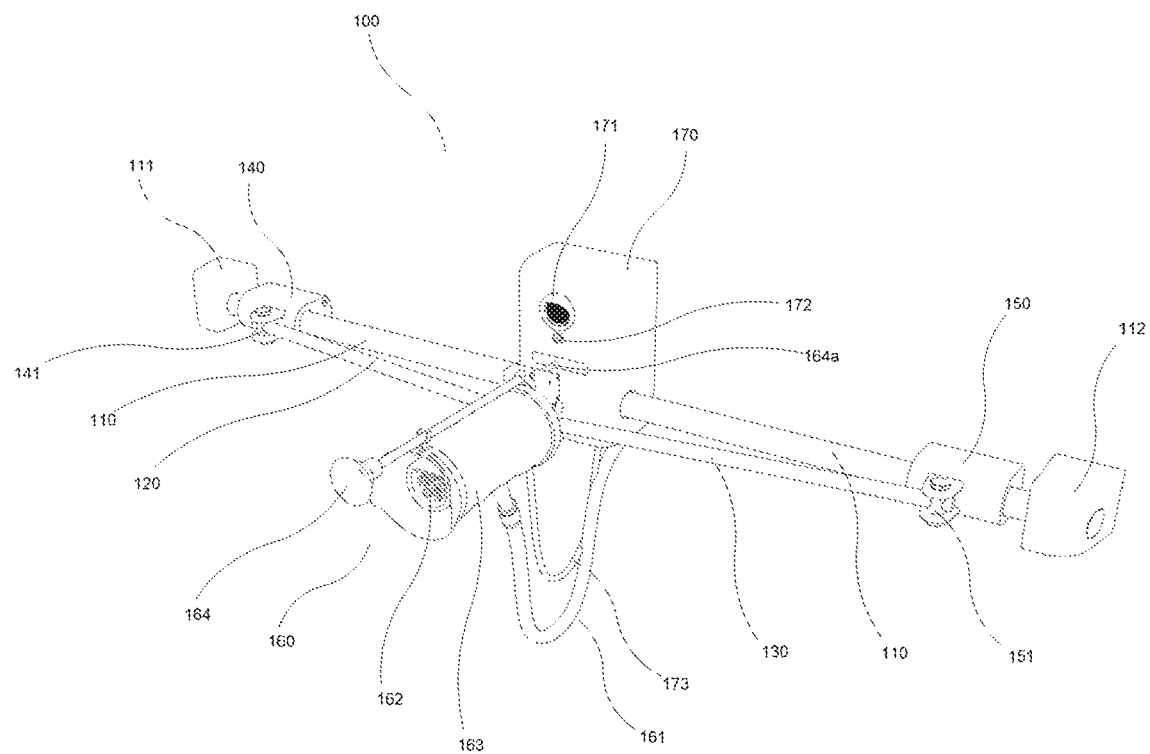
FIG. 1 is a simplified perspective view of a device according to the invention in a first state, in which a cable connecting unit 160 is retracted and a door opening means 164 is activated.

Hence, FIG. 1 illustrates an exemplifying embodiment of a device 100 according to the present invention, for automatically connecting a cable 161 to a parked vehicle. The vehicle is not disclosed in the Figures. In general, the vehicle may be a car, a truck, a bus, a motorcycle, or a specialized utility vehicle, and comprises a battery used to propel the vehicle. The cable 161 connects to the vehicle in order to provide electric power to the vehicle for charging such a battery, and is in general connected to an electric power supply, such as a charging box or the general power grid. For the same purpose, the vehicle comprises a connector, such as a socket, for connecting a cable for such electric connection. There are different standard types of such connectors, which are well-known as such and not described in any detail herein.

The device 100 is a robot arranged for fully automated and autonomous connection of a cable 161 to the vehicle, and will be described in detail in the following.

According to the invention, the device 100 comprises a first 120, a second 130 and a third 110 elongated element. Each of the elements 110, 120, 130 may be manufactured from a suitable, durable material, preferably a metal material such as stainless steel. Preferably, the third elongated element 110 may be a metal rod, which may preferably be cylindrical.

Furthermore, the device 100 comprises a first moving unit 140 which is pivotally connected, such as via a pivot joint 141, to a first end of the first elongated element 120. Similarly, the device 100 comprises a second moving unit 150, pivotally connected to a first end of the second elongated element 130, such as via a pivot joint 151.

Moreover, the device 100 comprises a cable connecting unit 160, pivotally connected, such as via pivot joints 165, 166, to a second, opposite, end of the first elongated element 120 and to a second, opposite, end of the second elongated element 130.

As a result, the first 120, second 130 and third 110 elongated elements together substantially define a triangle, with the cable connecting unit 160, the first moving unit 140 and the second moving unit 150 at the corners of the triangle. The triangle is preferably equilateral, such that the first 120 and second 130 elongated elements are of equal length. In other words, the distance between the cable connecting unit 160 and each of the moving units 140, 150 is preferably the same.

The third elongated element 110 is arranged to be fixedly mounted at a parking space, for instance using combined fastening and moving unit stopping members 111, 112. Preferably, the third elongated element 110 is arranged to be mounted substantially horizontally at 0.21 m, preferably at least 0.3 and preferably at the most 0.6 m, above a parking space floor. Further preferably, when the third elongated member 110 is mounted this way, it is preferred that the first 120 and second 130 elongated members are disposed substantially horizontally, such as extending at a respective angle in relation to the horizontal of between −10° and 10°. Preferably, this angle may be different but is always the same for both first 120 and second 130 elongated elements, and is achieved by an angular engagement between each moving unit 140, 150 and the third elongated element 110. Hence, the moving units 140, 150 are either controllably pivotable about the third elongated element 110 and/or the third elongated element 110 is controllably pivotable as such, about its longitudinal axis.

Preferably, the device 100 is centrally arranged at a short side of a parking space, towards which short side a parking vehicle approaches on its way to a parked position. The third elongated element 110 may be fastened directly to a vertical wall, or on a separate mounting structure.

Further according to the invention, the device 100 comprises a control unit 170, arranged to control the moving units 140, 150.

In particular, both moving units 140, 150 are arranged to be displaced in either direction along the longitudinal direction, such as horizontally, of the third elongated element 110, as controlled by the control unit 170. This may be achieved, for instance, by the moving units 140, 150 comprising a respective motor each, or by a motor being arranged in the control unit 170. Such a motor in the control unit 170 may be a screw motor, arranged to displace the moving unit 140, 150 in question along the third elongated element 110, or in any other way use a screw mechanism for displacing the moving unit 140, 150 in question. In order to keep the moving unit 140, 150 in rotational position when being displaced, a per se rotary stabilizing means may be used in the moving unit 140, 150 in question, such as a cylindrical geometry of the third elongated element 110 with which the moving unit 140, 150 can engage so as to fix an angular orientation of the moving unit 140, 150 in relation to the third elongated element 110.

The motors may be per se conventional electric motors, such as stepping motors. The motors may be powered via electricity provided using a cable inside the third longitudinal element 110, or in any other suitable way. The communication between the control unit 170 and each motor may be wireless, such as using Bluetooth®, or via the same or a different cable as used for providing said power to the motor in question. Such communication is conventional as such, and is not described in detail herein. Preferably, the motors, or the moving units 140, 150, also comprise respective sensors measuring a movement resistance, a read value from which is provided to the control unit 170 in a feedback loop. Such feed-back measurement value may be used to push the connecting means 162 only a predetermined ways into engagement with the vehicle's connector, or not to push too hard so as to break the vehicle's connector.

The displacement of the moving units 140, 150 causes the cable connecting unit 160 to be displaced in relation to the third elongated element 110. In particular, in case both moving units 140, 150 move in the same direction at the same velocity, the cable connecting unit 160 will move in parallel to the third elongated element 110. In case the moving units 140, 150 are moved relatively closer to each other, the cable connecting unit 160 will move away from the third elongated element 110, in a plane which is spanned by the first 120 and second 130 elongated elements. In case the moving units 140, 150 are moved relatively further from each other, the cable connecting unit 160 will move towards the third elongated element 110, in said plane. This way, the cable connecting unit 160 can be freely moved, the said plane, both laterally and longitudinally, so as to align itself to the vehicle connector. It is noted that the said plane is preferably substantially horizontal, or at least between −10° to 10° in relation to the horizontal. The third longitudinal element 110 is preferably straight, so that the moving units 140, 150 travel along the same, straight path.

Further according to the invention, the cable connecting unit 160 is arranged to connect the cable 161 to the vehicle by pressing a connecting means 162 against a corresponding connector of the vehicle. The connecting means 162 may preferably be a standard plug for connecting to the said connector, which plug is held by, or comprised in, the cable connector unit 160.

Such a device provides a very simple, robust and low-cost construction for automatically connecting a cable 161 to a parked vehicle. The system with elongated elements 110, 120, 130 provides a full range of motion to the cable connecting unit 160, as will be described herein below, while still providing sufficient manoeuvring precision to be able to provide reliable connection even in the absence of surveillance staff. The device 100 may advantageously be retrofitted in existing parking spaces, by simply mounting the device 100 using the fastening means 111, 112 to a vertical wall by the parking space in question.

The device 100 as such may be powered in any suitable, conventional manner, such as being permanently connected to the normal power grid.

Preferably, the device 100 is mounted at a vertical height corresponding to a height of the vehicle's connector, so that the cable connecting unit 160 merely has to move to the correct horizontal position to achieve the connection. However, according to a preferred embodiment, the device 100 comprises a stepping means, arranged to stepwise change a relative angle between the third elongated element 110 and each of the first and and second elongated elements 120, 130, as measured in a vertical angular direction of the third elongated element 110. In other words, the stepping means is arranged to pivot the above described plane spanned by the first 120 and second 130 elongated elements about a longitudinal axis of the third 110 elongated element. As a result, the cable connecting unit 160 moves upwards or downwards in a corresponding manner, at the same distance from the third elongated element 110. It is preferred, albeit not necessary in many cases, that the cable connecting means 160, and in particular pivot joints 165, 166, are arranged with a parallel rods aggregate, or similar purely mechanical means, so that the cable connecting means 162 is always held in a horizontal orientation irrespectively of the angular orientation of said plane.

The stepping means may be designed in different ways. However, it is preferred that it is activated using the movement of one or both of the moving units 140, 150, as controlled by the control unit 170. Hence, no additional control regarding the angle of the said plane is preferably imparted by the control unit 170, apart from the movement control of the moving units 140, 150 along the third elongated element.

Preferably, the stepping means is implemented in the following way. As at least one, or both, of the first 140 and second 150 moving units travel to either extreme end of a path along the third elongated element 110 along which the moving unit 140, 150 in question can travel, the moving unit 140, 150 in question mechanically engages with the stepping means as a result of arriving at said extreme position and being pushed in the same direction. In the Figures, the path for the first moving unit 140 is limited by the means 111 and the control unit 170; for the second moving 150 by the means 112 and the control unit 170.

The stepping means may hence comprise a pressure-activated means arranged, for instance, at the means 111; at the means 112; and/or at the control unit 170. When a moving unit 140, 150 arrives at such a pressure-activated means, and subsequently pushes against the pressure-activated means in question, the stepping means is activated. This activation may simply mean that the third elongated element 110 is turned about its longitudinal axis a predetermined angular distance, such as 0.5°, each time the stepping means is activated. When the stepping means has been activated a predetermined number of times, it may return to an initial angular orientation. Such mechanically activated stepping means are as such well-known, and are not described in detail herein. What is important is that it can be activated by the movement of the moving unit 140, 150 as such, along the third elongated element 110, and does therefore not require an additional control loop in connection to the control unit 170.

It is realized that the stepping means, and in particular the pressure-activated means, may also be comprised in both or either of the moving units 140, 150, or in the control unit 170. The pressure-activated means may also be comprised in the control unit 170 and arranged to be activated by the cable connecting unit 160 being pressed against the control unit 170.

Hence, the control unit 170 may be arranged to control the vertical height of the cable connecting unit 160 above the floor, and as a result also the height of the connecting means 162, as appropriate to achieve the connection to the vehicle's connector, by repeatedly moving both or one of the moving units 140, 150 to a predetermined extreme position and there activating said activation means, and/or by moving the moving units 140, 150 apart so as to press the cable connecting unit 160 against a pressure-activated means comprised in the control unit 170. For instance, if the stepping means is designed to move the cable connecting unit 160 one step upwards as a result of such an activation, and the cable connecting unit 160 is to be lowered, then the control means 160 activates the stepping means repeatedly, moving the cable connecting unit 160 upwards stepwise, until the cable connecting unit 160 reaches a maximally raised position. By activating the stepping means once more, the cable connecting unit 160 again falls down to a maximally lowered position. By proceeding to activating the stepping means, the cable connecting unit 160 may again be raised, in steps, until a desired vertical position has been reached. It is noted that a vertical distance from the ground of the cable connecting unit 160 is dependent upon a distance from the third elongated element 110 of the cable connecting unit 160. However, these parameters are known to the control unit 170, and can hence be determined. As a supplement or alternative thereto, the control unit 170 may control the vertical and/or horizontal position of the cable connecting means 160 in a feedback loop manner, using cable connecting unit 170 position information gained by automatic visual inspection using a digital camera of the type described in the following.

Hence, according to a preferred embodiment, the device 100 further comprises a digital camera 171, arranged to capture an image of the vehicle and to provide the captured image to the control unit 170. Preferably, the image also covers the cable connecting unit 160, so that the control unit 170 can determine a relative position of the cable connecting unit 160 to the vehicle's connector. The digital camera 171 may preferably be arranged in a camera unit, such as also comprised in the same housing, or being, the control unit, arranged along the third elongated element 110 and forming a stop to the first 140 and second 150 moving units, as illustrated in the Figures. This provides both a simple, compact design and proper camera 171 visibility.

Preferably, the camera is a normal 2D digital camera 171 supplemented by a distance-measuring laser sensor. Then, the laser sensor measures the distance to the vehicle's connector and the camera measures the position, in a vertical plane, of the vehicle's connector and of the cable connecting unit.

Hence, the control unit 170 is arranged to detect a relative position of the cable connecting unit 160 in relation to the connector of the vehicle, and to control the first 140 and second 150 moving units so that the cable connecting unit 160 moves towards the connector of the vehicle. The "detection" here is based upon an automatically performed, digital image analysis based upon an image captured by the camera 171. Such image analysis is well-known as such, and is not discussed in detail here. However, it may preferably be based upon the detection of predetermined visual signalling means of the cable connecting unit 160 and of the vehicle's connector, such as well-defined shapes, colours and/or stickers.

In particular, using the compact design illustrated in the Figures, with the camera 171 arranged along and in connection to the third elongated element 110, preferably so that the vehicle's connector, when the vehicle is parked in front of the device 100, it has turned out that a conventional, low-cost web camera-type camera 171 can be used and still achieve sufficiently good precision so as to reliably achieve the desired connection. Specifically, it is preferred that the camera 171 is arranged so that the expected position of the parked vehicle's connector is close to the centre of the camera's field of view.

In order to allow for a larger tolerance, it is preferred that the cable connecting unit 160 comprises a alignment means, such as a cone-shaped head 162a, arranged to align the cable 161 to a predetermined geometry of the connector of the vehicle. As shown in the Figures, the cone-shaped head 162a may be a part of the connecting means 162. When moved towards and into engagement with the vehicle's connector, the cone-shaped head 162a will automatically align the connecting means 162 to the vehicle's connector, guaranteeing that a connection can be established by pushing the cable connecting unit 160 further against the vehicle. In order to allow certain vertical and horizontal movement during the alignment, it is preferred that the first 120 and second 130 elongated elements are not completely rigid, but allow for some resilient displacement of the cable connecting unit 160 when subjected to a corresponding force.

Similarly, such resilience of the first 120 and second 130 is preferred in order to allow for the vehicle to, by mistake, bump into the device 100, without causing damage. Therefore, it is preferred that the first 120 and second 130 elongated elements are in the form of relatively stiff, elongated metal coils or springs, allowing the control unit 170 to control the position of the cable connecting unit 160 and to press it against the vehicle for achieving the connection, but to also allow the above-described alignment slack and also being able to absorb the mechanical energy from a vehicle bumping into the device 100 by bending inwards towards the third elongated element 110.

According to a preferred embodiment, the cable connecting unit 160 further comprises a door opening means 164, arranged to open a door of the vehicle to the connector of the vehicle, by the cable connecting means 160 pushing against the door a first time and then retracting, and in that the cable connecting means 162 is arranged to then, by pushing forwards a second time, against the connector, connect the cable 161.

In the Figures, an exemplifying door opening means 164 is shown in the form of a suction cup, which is pressed against the door and therefore engages with the door to open the door when being drawn back together with the cable connecting unit 160. It is realized that other engagement means, other than a suction cup, may be used, depending on the design and type of door.

Figure 2:
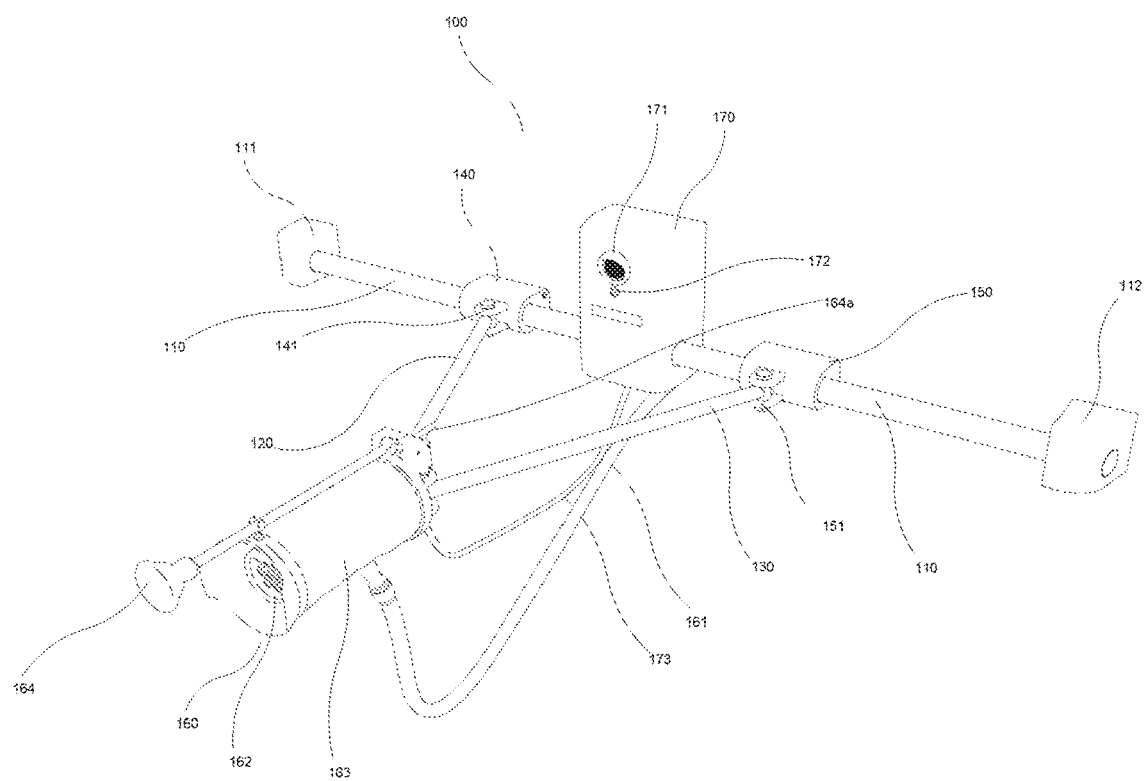
FIG. 2 is a simplified perspective view of the device shown in FIG. 1 in a second state, in which the cable connecting unit 160 has been moved forward and the door opening means 164 is still activated.
Figure 3:
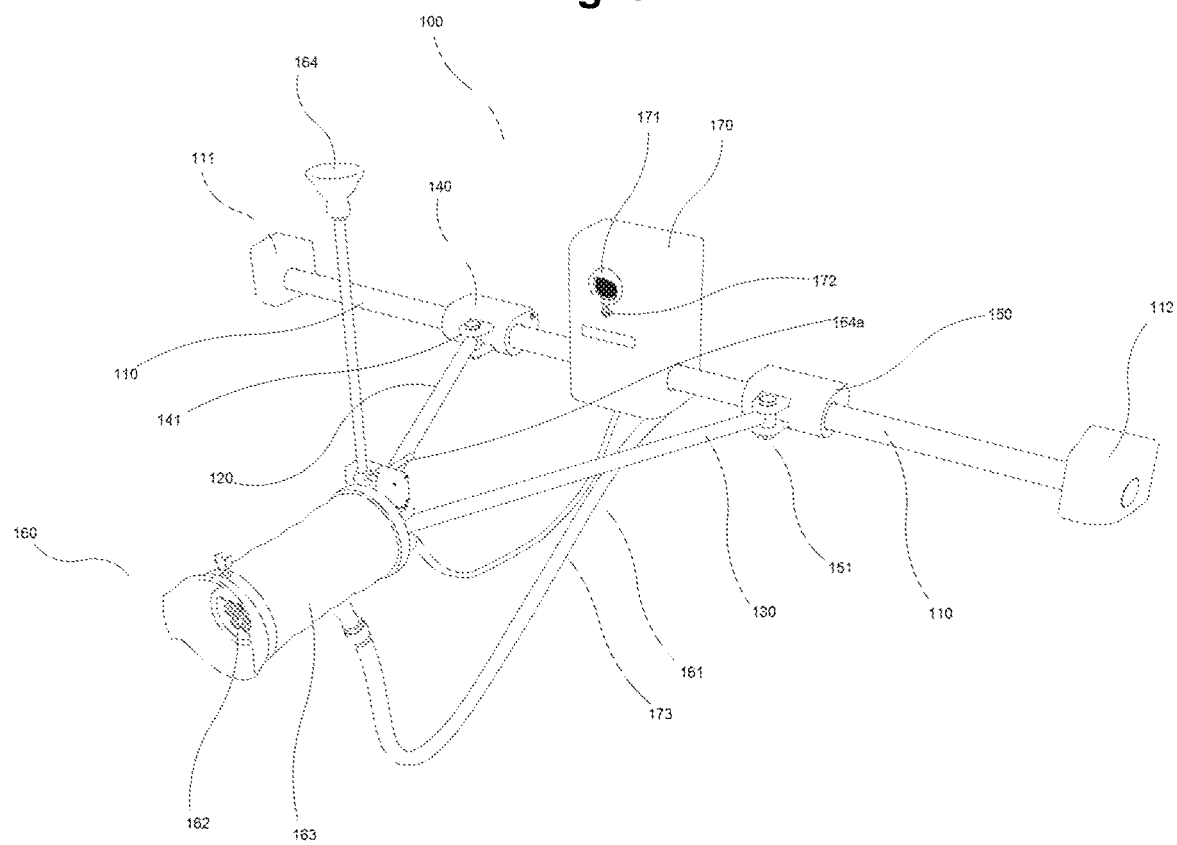
FIG. 3 is a simplified perspective view of the device shown in FIG. 1 in a third state, in which the cable connecting unit 160 is still in a forward position but wherein the door opening means 162 is inactivated.
Figure 4:
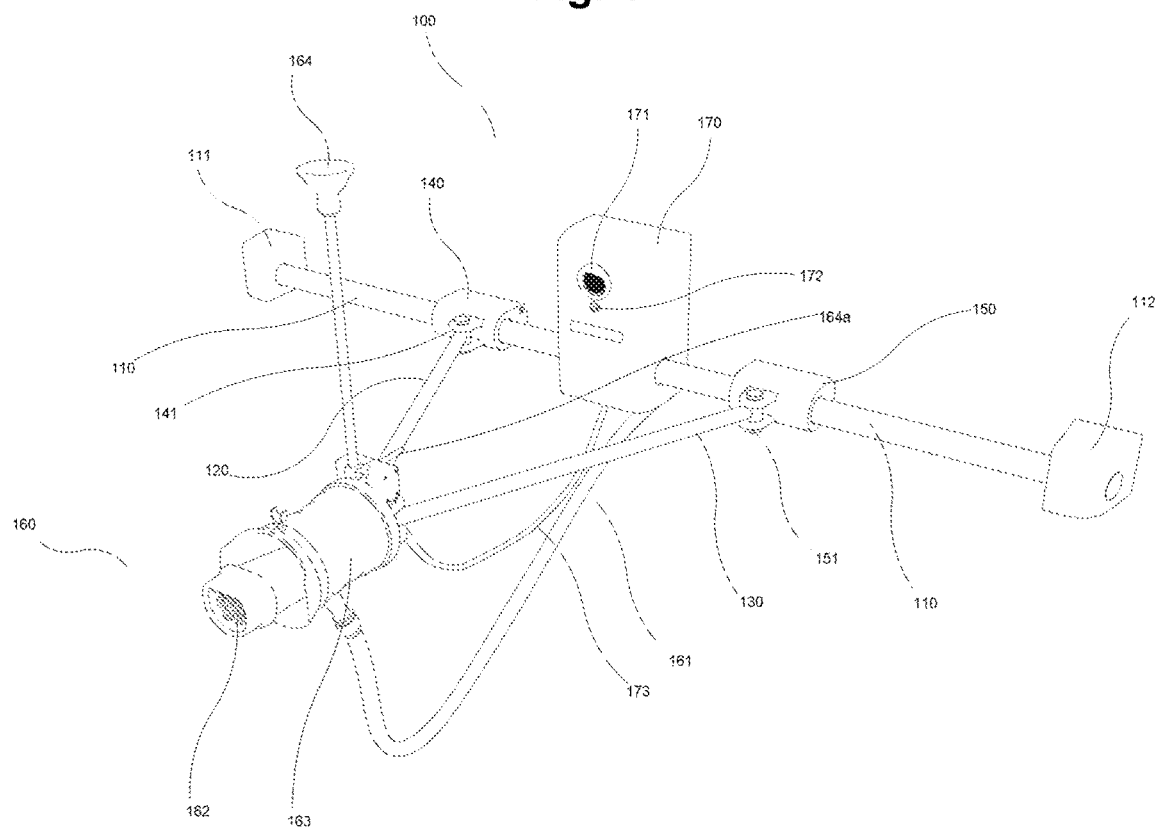
FIG. 4 is a simplified perspective view of the device shown in FIG. 1 in a fourth state, which is similar to the third state but in which a flexible housing 163 is partly retracted.
Figure 5:
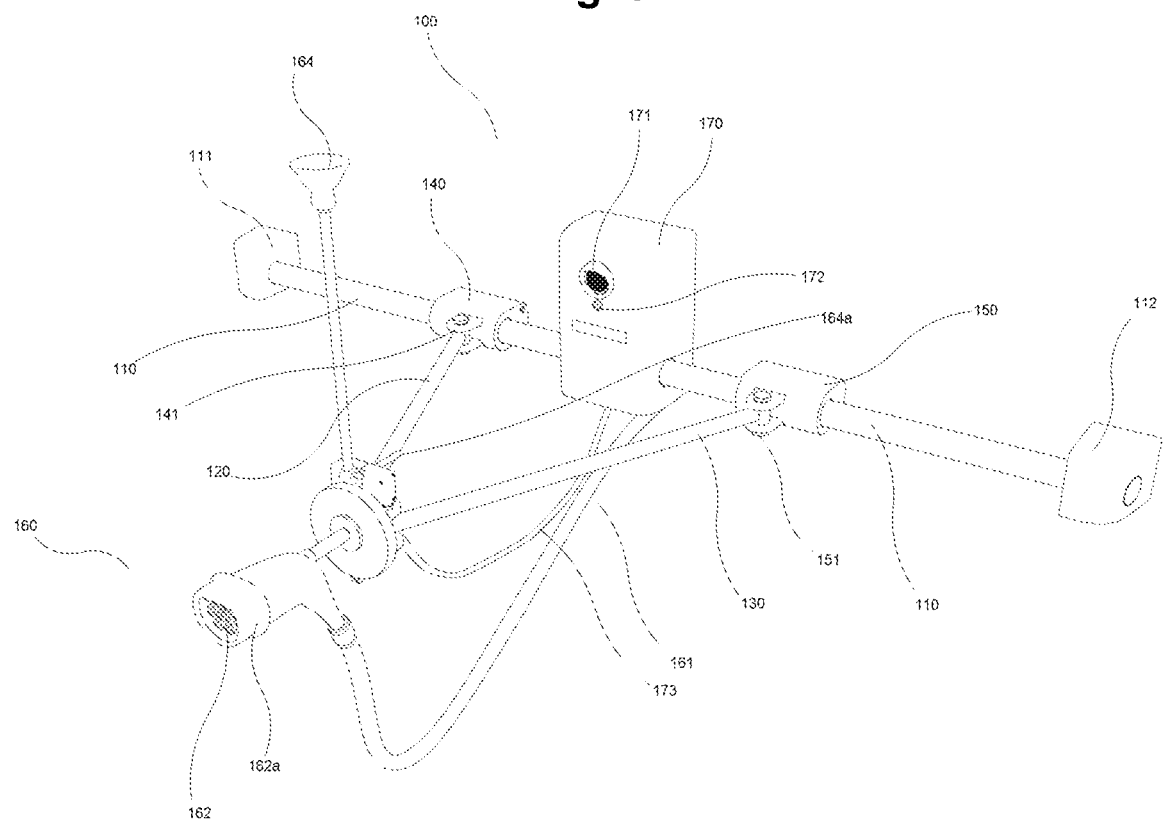
FIG. 5 is the view of FIG. 4 with a flexible housing removed.
Figure 6:
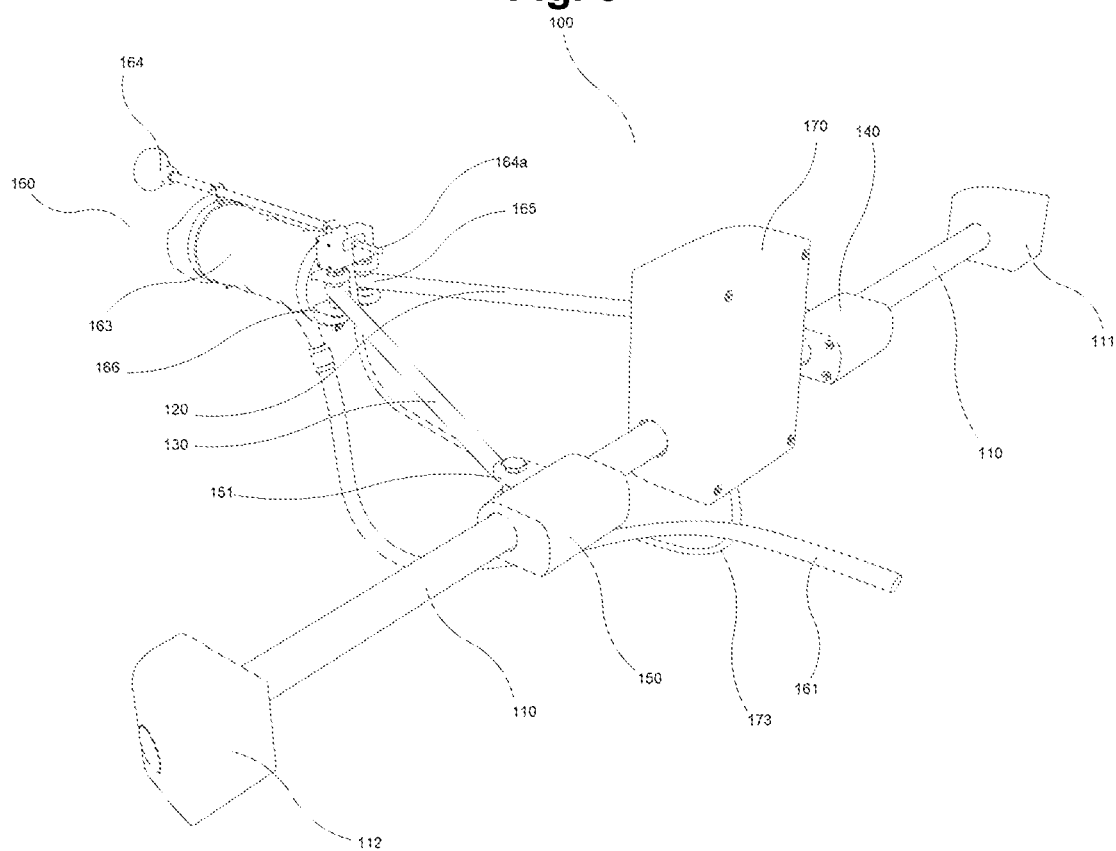
FIG. 6 is a simplified perspective view of the device shown in FIG. 1 in the second state as seen from a different angle.

It is preferred that the door opening means is activated by a pressure-activated activating means which may be similar (or even the same) as the above-described pressure-activated means for changing the vertical position of the cable connecting unit 160. In the Figures, an exemplifying pressure-activated activation means is illustrated comprising a sprint 164a on the cable connecting unit 160 arranged to cooperate with a corresponding pushbutton 172, which is pressed in by the sprint 164a when the cable connecting unit 160 is moved to an extreme position towards the control unit 170. Preferably, the pressure-activated activation means is designed so that every other time the cable connecting unit 160 is pressed against the control unit 170, the door opening means 164 is activated, such as by being folded into the horizontal position shown in FIGS. 1 and 2, and every other time it is inactivated, such as being folded into the vertical position shown in FIG. 3.

In general, it is preferred that the door opening means 164 is arranged to be activated by the cable connecting means 160 being pressed towards the third elongated element 110.

The cable connecting unit 160 may comprise a spring-loaded bellows structure 163, or other flexible, spring-loaded structure, which protects the connecting means 162 and is pressed back from the connecting means 162 as a result of the cable connecting unit 160 being pressed against a side surface of the vehicle as the connecting means 16 is pushed into connecting engagement with the vehicle's connector.

Preferably, the pivot joints 141, 151, 165, 166 are entirely passive and not controlled or driven in any manner.

Preferably, the cable 161 is arranged separate from the elements 110, 120, 130, such as hanging loosely and being fixed at a vertical wall in connection to the third elongated element 110.

The cable 173 is a signal cable between the cable connecting unit 160 and the control unit 170. Instead of such a signal cable, it is also possible to use wireless communication.

The present invention also relates to a method for automatically connecting a cable 161 to a parked vehicle, using a device 100 of the present type.

Such a method comprises a step in which a cable connecting device 100 of the above described type is provided at a parking space. This step may, of course, be performed at an earlier point in time than subsequent steps, and may involve the retrofitting of the device 100 at an existing parking space.

Thereafter, such a method comprises the step of causing the control unit 170 to control the movements of the first 140 and second 150 moving units along the third elongated member 110 so that the cable connector unit 160 moves towards a connector of the vehicle. This step also preferably comprises the positioning of the cable connecting unit 160 in relation to an identified connector and/or door of the vehicle, based upon the digital image recognition described above and preferably in a feedback manner between the control unit 170, the moving units 140, 150, the cable connecting unit 160 and the camera 171, as well as possibly also the above described force sensors of the moving units 140, 150.

Thereafter, the control unit 170 is caused to control the movements of the first 140 and second 150 moving units along the third elongated member 110 so that the connecting means 162 of the cable connecting unit 160 is pressed against a corresponding connector of the vehicle, thereby establishing an electric connection between the cable 161 and the vehicle.

Thereafter, an electric current is provided through the cable 161 and to the vehicle for charging the battery of the vehicle.

At a later point, such as when the vehicle is about to leave the parking space, the control unit 170 may be controlled to simply pull the cable connecting unit 160 back from the vehicle, towards the third elongated element 110, whereby the connection comes loose. The door may close automatically, by a spring-loading provided in the vehicle or similar. It may also be so that the driver of the vehicle simply backs the vehicle, away from the device 100. For this purpose, it is preferred that the control unit 170 is arranged to provide a certain resistance to such backing, providing a pulling force to the cable connecting unit 160 and the connecting means towards the third elongated element 110, so that the connecting means 162 disengages from the connection engagement with the vehicle's connection as a result of such vehicle backing and coming loose from the vehicle.

The method may also comprise a step in which the door opening means 164 closes the vehicle's door, such as by the suction cup illustrated in the Figures being pressed, in its activated state, towards the door after the cable 161 has been disconnected, so as to securely closing the door in question.

Then, the device 100 is ready for another connection.

The connection method step sequence may be initiated by a driver of the vehicle activating a remote control in communication with the control unit 170, once the vehicle is parked. However, the control unit 170 may also be arranged to automatically detect the presence of a compatible vehicle at the parking space. This may, for instance, be achieved using RFID technology, the vehicle carrying an active or passive RFID circuit emitting information allowing the control unit 170 to receive the information and to interpret it so as to know that the parked vehicle is present and compatible with the device 100. Alternatively, an automatic parking assistance functionality of the vehicle may be arranged to communicate with the control unit 170 in a suitable, conventional wireless manner, so that the control unit 170 receives a command when the vehicle is in a position in which the cable 161 can be automatically connected.

In general, time is not critical for such connection. Therefore, the device 100 may be implemented using standard, simple parts, perhaps requiring one or even several minutes in order to achieve the connection to the vehicle's connector. Since the driver of the vehicle can leave the parking space as soon as the parking is ready, and does not have to attend the device 100 finalizing the connection, this is however not a major drawback.

According to a preferred embodiment, the device 100 comprises a distance-determining means in the form of a simple string hanging freely from a roof above the parking space. Then, the driver of the vehicle can drive the vehicle forwards until the string touches the window pane of the vehicle, and thus receive information that the vehicle is positioned in a suitable forwards position. Since the cable connecting unit 160 can be moved sideways, the sideways position of the vehicle is not very critical for achieving a connection, as long as the vehicle is located within the parking space.

Preferably, the length of the first and second elongated elements are between 0.5 and 1.5 meters, and the length of the third elongated element 110 is at least 1.0, further preferably at the most 3.0 meters.

When the moving units 140, 150 are relatively close together, which is the case when the cable connecting unit 160 is close to the vehicle, the pressing force imparted by the moving units 140, 150 pushing the cable connecting device further towards the vehicle is at its strongest due to the lever effect, which is an advantage.

Apart from the stepping means, there is preferably no other actively operating height-adjustment functionality for the cable connecting unit 160.

Figure 7:
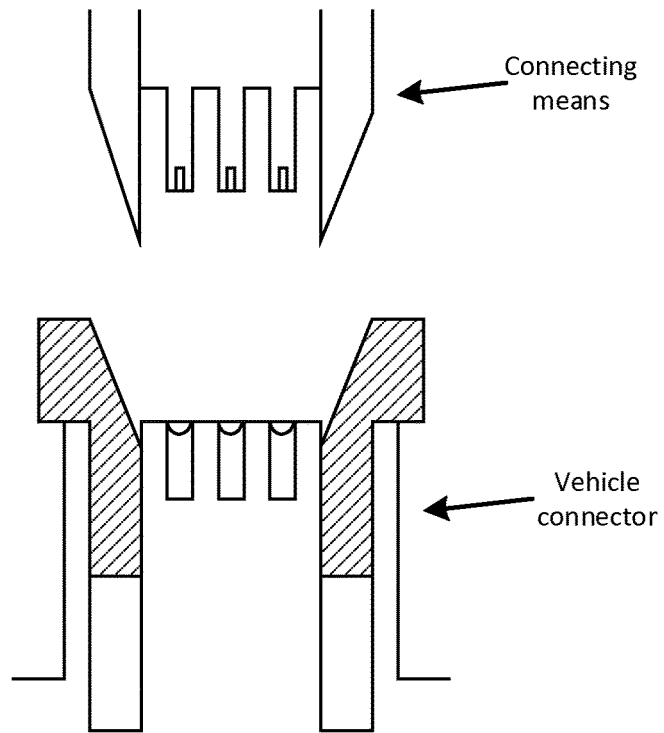
FIGS. 7 and 8 illustrate two different examples of cone-shaped alignment means of a connector means according to the invention, for use with corresponding connectors on a vehicle.
Figure 8:
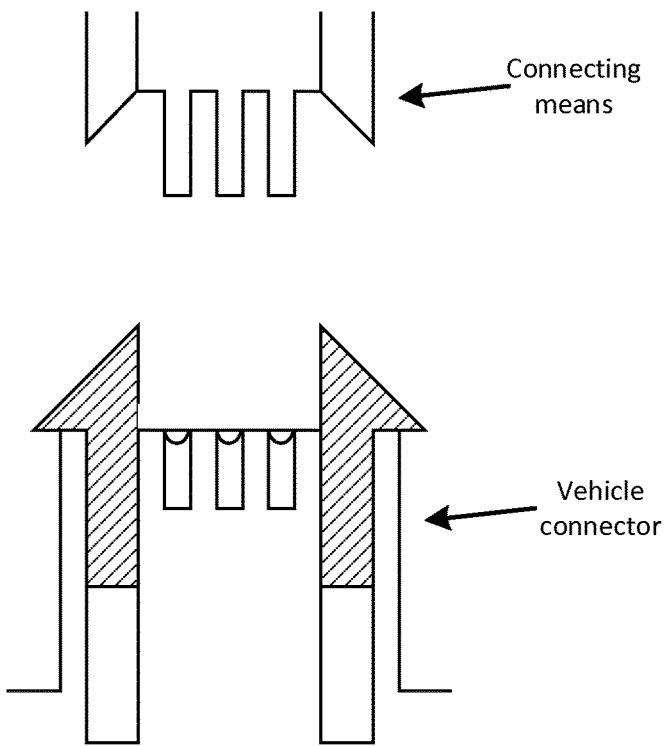

In order to improve the functionality of the cone-shaped head 162a, described above, the device according to the invention may also comprise a separate device arranged for being mounted in the vehicle, around an electrical connector to which the cable 161 is to be connected. Such a separate device is preferably made in plastic, rubber or a similar resilient material, and is preferably designed to snugly fit around the vehicle's connector in question as a collar. The separate device provide a male or a female conical surface, with which the cone-shaped head 162a is arranged to interact and which has a shape which is complementary to the conical surface of the separate device. Two (male and female, respectively) examples of this is shown in FIGS. 7 and 8, respectively, in which the striped lines parts constitute the separate devices. Such separate devices are preferably specifically adapted to fit in particular vehicle models.

Above, preferred embodiments have been described. However, it is apparent to the skilled person that many modifications can be made to the disclosed embodiments without departing from the basic idea of the invention.

For instance, the door opening means may be designed in ways different from the suction cup illustrated in the Figures. Examples include a turning means, arranged to turn a knob or similar on the door; or a pin arranged to press a button on the door.

The moving units 140, 150 and/or the cable connecting unit 160 may further comprise a resilient connection to the rest of the device 100, such as via a rubber connecting element, in order to provide the above-described resilience in turn providing the slack for achieving the connection using the cone-shaped of the connection means 162.

The device 100 may also comprise more than one cable connecting unit 160 along the same third elongated element 110, for parallel connection to several vehicles at the same time.

The height adjustment of the cable connecting unit 160 may also be implemented using a separate driving motor, such as a motor rotating the third elongated element 110 about its longitudinal axis.

Everything which is said regarding the device 100 is equally applicable to the method according to the invention, and vice versa.

Hence, the invention is not limited to the described embodiments, but can be varied within the scope of the enclosed claims.

The invention claimed is:

1. Device for automatically connecting a cable to a parked vehicle, comprising:
   a first, a second and a third elongated element;
   a first moving unit, pivotally connected to a first end of the first elongated element;
   a second moving unit, pivotally connected to a first end of the second elongated element;
   a cable connecting unit, pivotally connected to a second end of the first elongated element and to a second end of the second elongated element; and
   a control unit,
   wherein the third elongated element is arranged to be fixedly mounted at a parking space,
   wherein in that both moving units are arranged to be controlled by the control unit to be displaced in either direction along the third elongated element,
   wherein such displacement causes the cable connecting unit to be displaced in relation to the third elongated element, and
   wherein the cable connecting unit is arranged to connect the cable to the vehicle by pressing a connecting means against a corresponding connector of the vehicle.

2. Device according to claim 1, wherein the first, second and third elongated elements together substantially define a triangle, which is preferably equilateral.

3. Device according to claim 1, wherein the third elongated element is in the form of a metal rod, which is preferably arranged to be mounted substantially horizontally at 0.2-1 m above a parking space floor.

4. Device according to claim 1, wherein the device comprises a stepping means, arranged to stepwise change a relative angle between the third elongated element and each of the first and second elongated elements, as measured in an angular direction of the third elongated element as at least one of the first and second moving units travels to either extreme end of a path along the third elongated element along which the moving unit in question can travel, whereby the moving unit in question mechanically engages with the stepping means as a result of arriving at said extreme position.

5. Device according to claim 1, wherein the device further comprises a digital camera, arranged to provide an image of the vehicle to the control unit, whereby the control unit is arranged to detect a relative position of the cable connecting unit in relation to the connector of the vehicle, and to control the first and second moving units so that the cable connecting unit moves towards the connector of the vehicle.

6. Device according to claim 5, wherein the digital camera is arranged in a camera unit, in turn arranged along the third elongated element and forming a stop to the first and second moving units.

7. Device according to claim 1, wherein the cable connecting unit comprises a cone-shaped head, arranged to align the connecting means to a geometry of the connector of the vehicle.

8. Device according to claim 1, wherein the cable connecting unit comprises a door opening means, arranged to open a door of the vehicle to the connector of the vehicle, by the cable connecting unit pushing against the door a first time and then retracting, and wherein in that the cable connecting unit is arranged to then, by pushing forwards a second time, against the connector, connect the cable.

9. Device according to claim 8, wherein the door opening means is arranged to be activated by the cable connecting unit being pressed towards the third elongated element.

10. Method for automatically connecting a cable to a parked vehicle, comprising:
   a) providing, at a parking space, a cable connecting device, comprising a first, a second and a third elongated element; a first moving unit, pivotally connected to a first end of the first elongated element; a second moving unit, pivotally connected to a first end of the second elongated element; a cable connecting unit, pivotally connected to a second end of the first elongated element and to a second end of the second elongated element; and a control unit, the third elongated element being fixedly mounted at a parking space, both moving units being arranged to be displaced, as controlled by the control unit, in either direction along the third elongated element, so that such displacement causes the cable connecting unit to be displaced in relation to the third elongated element;
   b) causing the control unit to control the movements of the first and second moving units along the third elongated member so that the cable connector unit moves towards a connector of the vehicle; and
   c) causing the control unit to control the movements of the first and second moving units along the third elongated member so that a connecting means of the cable connecting unit is pressed against a corresponding connector of the vehicle, thereby establishing an electric connection between the cable and the vehicle.

\* \* \* \* \*